UNITED STATES PATENT OFFICE.

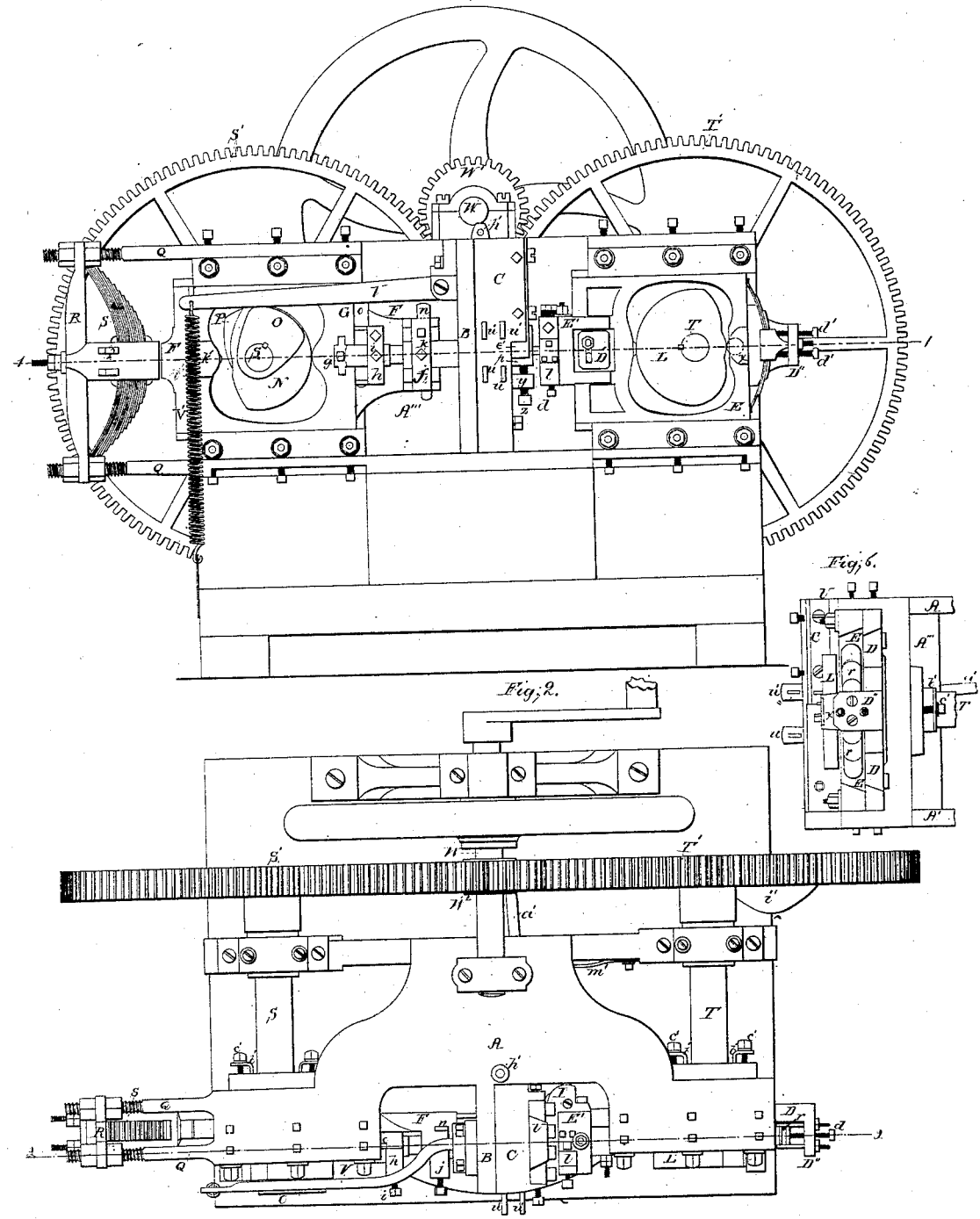

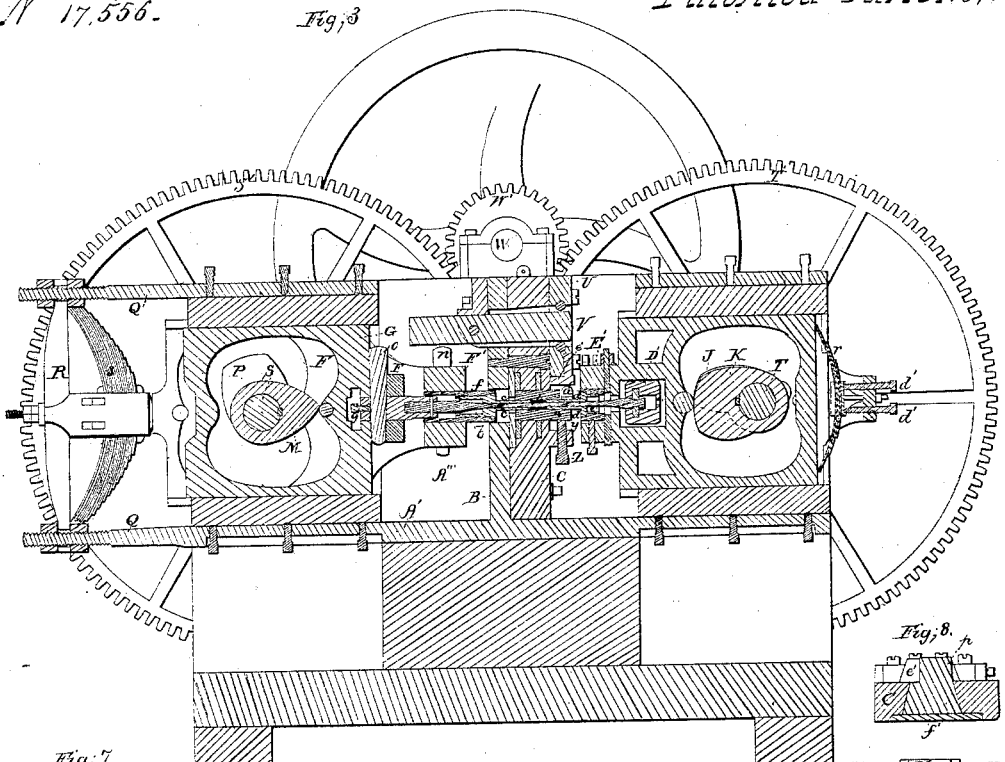
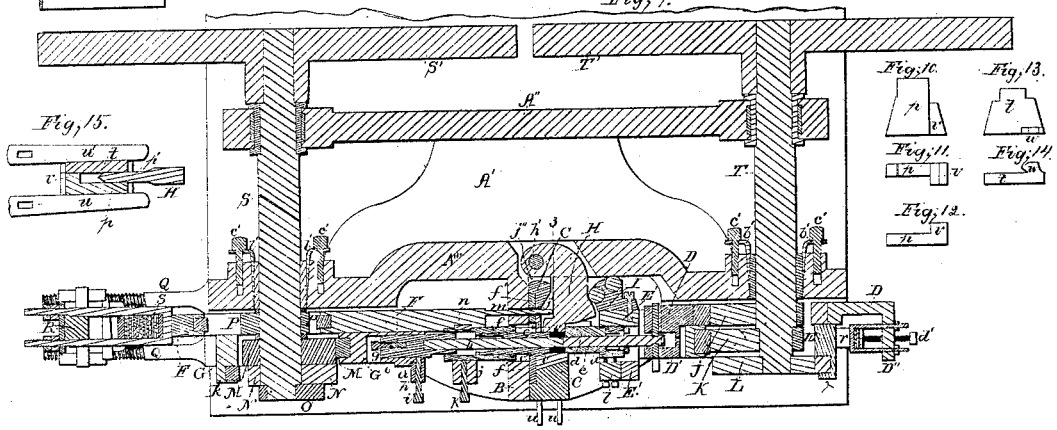

R. H. COLE, OF ST. LOUIS, MISSOURI.

MACHINE FOR MAKING AX-POLLS.

Specification of Letters Patent No. 17,556, dated June 16, 1857.

*To all whom it may concern:*

Be it known that I, RICHARD H. COLE, of St. Louis, in the State of Missouri, have invented a Machine for Making Ax-Polls; and I do hereby declare that the following is a full and exact description thereof, reference being had to the accompanying drawings, making a part of this specification, Figure 1 being a side elevation of said machine; Fig. 2, a top view; Fig. 3, a vertical section in the line 2 2 of Fig. 2; Fig. 4, a horizontal section in the line 1 1 of Fig. 1; Fig. 5, a horizontal section of a part of the machine in the line 1 1 of Fig. 1, showing the movements thereof in different positions from those represented in Fig. 4; Fig. 6, an elevation of a portion of the right-hand end of the machine; and Figs. 7, 8, 9, 10, 11, 12, 13, 14, and 15 are detached portions of the machine shown in detail.

Similar letters indicate like parts in each drawing.

The accompanying drawings represent a suitable form of metallic frame for receiving the respective movements of my machine for making ax-polls. The different parts of said frame are indicated by the letters A′, A″, A‴ and B. The respective parts $p$ $t$, $v$ $w$, which compose three sides of the die-box of said machine, are combined with the perforated head block C, which is bolted to the right-hand side of the front projection B, of the frame of the machine. The shape of the said die-box sections $p$, $v$, $t$ $w$, are shown in the accompanying drawings, by Figs. 10, 11, 12, 13, 14 and 15; and the shape of the aperture in the block C, which receives said sections, is shown by Figs. 8 and 9. The flat plate $f'$, which is let into a recess in the left-hand side of the said block C, closes the die-box aperture on that side, with the exception of the perforations $g'$, $q'$, in said plate, which are shown in Fig. 7. The vertical sides of the said die-box aperture in the block C, incline toward each other as they pass from the plate $f'$, toward the right-hand face of said block; and an outwardly flaring horizontal groove $j'$, opens from the central portion of the rear side of the said die-box aperture into the notch $j''$ in the inner or rear edge of the block C.

The portion $p$, of the die-box section $p$ $v$, forms the lower side of the die-box, and the lip $v$, of said section, forms the front side of said die-box; the flaring groove $j'$, in the face of the block C, (which opens outwardly toward the rear from the die-box aperture in said block,) enables the said section $p$ $v$, to be readily inserted into or removed from its positions in said aperture. The portion $t$, of the die-box section $t$ $w$, forms the upper side of the die-box, and the portion $w$, of said section, forms a guide to the grooved side of the sliding shank $c$, whose extremity forms the left-hand movable side of said die-box. The rear section $p'$, of said die-box, is a sharpened projection from the movable plate H, which is shown in different positions in Figs. 4, and 5. The rear edge of the said plate H, is received into a slit in the portion A‴ of the frame of the machine and works on the vertical pivot $h'$. A portion of the lower section $p$, of the die-box extends forward, outside of said box, a distance equal to, or a little greater, than the desired width of the ax, whose poll is to be formed in the machine. The portion of the said section $p$, within the die-box, rests upon the tapering keys $u$, $u$, and the projecting portion of said section, rests upon the set-screw Z, which passes up through the leg $y$, on the face of the block C. The inner end of the upper section $t$, of the die-box, rests upon its lip $w$, and the outer end of said section is sustained by the inwardly projecting rear side $p'$ of the die-box—as shown in Fig. 15. The said outer extremity of the section $t$, of the die-box, projects a short distance beyond the outer end of the front side $v$, of said box. Tapering keys $u'$, $u'$, which pass through suitable apertures in the block C, act upon the upper side of the upper section $t$, of the die-box; which keys, in conjunction with the keys $u$, $u$, and the set-screw $z$, enable the respective sections of the die-box to be perfectly adjusted to their proper positions and securely retained in said positions.

The cutter $e'$, which, at the proper moment, severs the blank for an ax-poll from a heated bar, is secured to the lower end of the vertically reciprocating head U, which works between suitable guiding ways secured to the face of the block C. The requisite movements are imparted to the said cutter head U, by means of the pivoted lever V, the cam O, (Fig. 1,) on the shaft S, and the spring V′, which connects the outer end of said lever with the floor, or with the bottom of the machine. The inner side of the said cutter $e'$, bears against the lateral outer edge of the projecting portion of the upper section $t$, of the die-box, (see Figs. 8 and 9,) and the inner actuating angle of said cutter, as it descends, passes so close to the outermost upper angle of the projecting portion of the lower section $p$, of the die-box, as to cut off any suitable metallic substance that may be inserted between the said projecting portions $t$, $p$ of the said die-box sections.

The proper position for the rear section $p'$, of the die-box at the time that the end of a heated-bar is to be thrust into the machine, is shown in Fig. 5. The end of the said bar should press against the edge of the said rear section of the die-box, and the cutter $e'$, after it has descended and severed a blank for an ax-poll, remains in its depressed position long enough to aid the projecting portions of the respective die-box sections in guiding the said blank ax-poll into the die-box, as it is carried forward by the angular punch $d$, which advances the instant after the said blank has been severed from the bar.

The angular punch $d$, is connected, in any suitable and proper manner, with the head $E'$, of the perforated sliding plate E, which works within suitable supporting and guiding bearings secured to the front vertical portion of the right-hand end of the machine. The said angular punch $d$, has a longitudinal perforation for the reception of the closely fitting oval punch $e$. The said oval punch $e$, is connected in any suitable and proper manner with the laterally projecting head $D'$ of the sliding plate D. The said plate D, is placed immediately in the rear of the sliding plate E, and is sustained and guided by means of suitable bearings secured within the recessed right-hand-end of the machine. The laterally projecting head $D'$, of the sliding plate D, projects through an opening, of suitable size, in the front plate E.

The projection I, which is secured to the inner side of the head $E'$, of the sliding plate E, carries an anti-friction roller that bears against the vertical portion $A'''$, of the frame of the machine and serves to steady the said sliding plate in its movements; the said projection I, also carries a front roller that strikes against and carries inward, at the proper moment, the plate H, from which projects the rear section $p'$ of the die box.

The proper reciprocating movements are imparted to the sliding plate D, by means of the cam J, on the shaft T, which works within an aperture in said plate. I generally combine anti-friction rollers with the front and rear surfaces of the opening in the sliding plate D, for the actuating surfaces of the cam J, to act against; and I also generally combine similar rollers with the other sliding plates of the machine.

The proper reciprocating movements are imparted to the sliding plate E, by means of the cams K, and L, on the shaft T; the cam K, working within the opening in said plate, and the cam L, working outside of said plate, against the front projection $x$, on the right-hand end thereof.

The outer extremity of the shank or plate $c$, forms the left hand movable section of the die box in my said machine for making ax-polls; which portion of said die box is secured within and projects from the head $F'$, of the sliding plate F. The shape of the said portion $c$, of the die box, and also the shape of the oval punch $b$, which passes through a longitudinal perforation in said section, is clearly shown in Fig. 6. The oval punch $b$, is secured within the socket holder $a$, and the said holder $a$, is securely fastened to the inner end of the sliding plate G. The key $n$, the clamp $j$, and the set-screw $i$, serve to secure the holder $a$, of the oval punch $b$, within a recess in the inner end of the sliding-plate G. The set-screw $g$, which works in an aperture in the outer end of the punch holder $a$, and acts against the outer edge of the key $o$, enables the punch $b$, to be longitudinally adjusted to any desired position. The sliding plates F, and G, are placed in a recess in the front left-hand portion of the frame of the machine and are guided and supported in their horizontal movements by means of suitable bearings secured in proper positions by set-screws, or other equivalent devices.

The cam P, on the shaft S, works within the opening in the sliding plate F, and imparts the necessary reciprocating movements to said plate; and the cams M, N, on the same shaft, impart the requisite movements to the sliding plate G. The forward movements are imparted to the said plate G, by the cam M, which works within the opening of said plate; and the rearward movements are imparted to said plate by the outside cam N, which acts against the projection $k'$, on the left hand end of said plate.

The spindle $m$, which projects from the inner end of the sliding-plate F, passes through an aperture in the portion B, of the frame of the machine into the aperture $q'$, which leads through the plate $f'$, and the block C, to the groove $j'$, in said block, immediately opposite the edge of the plate H; so that the forward movement of the plate F, must necessarily cause the spindle $m$, to throw the plate H, into the position shown in Fig. 5.

The laterally projecting head $D''$, at the outer end of the sliding-plate D, has a spring $r$, combined with it which bears against the outer end of the sliding plate E; which spring acts equally on both of said sliding plates and consequently, its effect will be to keep the cam-actuating surfaces of said plates firmly pressed against the surfaces of their actuating cams. The advantages resulting from the action of the said spring r, upon the sliding plates D, and E, will be readily understood by all practical machinists.

The strong spring s, which is combined with the four screw-arms Q, that project from the left-hand end of the frame of the machine, is placed in such a position that the outer end of the sliding plate F, will bear against said spring at the time that an ax-poll is being formed in the die-box. The said spring should be arranged within its holders in such a manner that its position may be adjusted and its elasticity varied as circumstances may require.

The shafts S, and T, are geared to each other and to the driving shaft W, by means of the toothed wheels S', and T', on the former, and the toothed wheel W', on the latter, as represented in the drawings.

When the portions of the machine which are represented in Fig. 5, have attained the position shown in that drawing, the cam O, on the shaft S, will be in such a position that the outer end of the lever V, will be drawn down to its lowest attainable position by the spring V', and consequently, the cutter head U, will be in its most elevated position; the cam L, on the shaft T, and the cam N, on the shaft S, will also at the same time be simultaneously acting, with their extended surfaces, upon the sliding plates E, and G. Now should the end of a heated metallic bar, of the proper shape, be introduced to its proper position within the machine at the point of time when its respective movements have attained the aforesaid positions, a blank will be cut from the said bar, and that blank be converted into an ax-poll and then be discharged from the machine, in the following manner, viz: At the instant that the cutter e', completes its work, the cams L, and N, cease their outward action upon the sliding plates E, and G, and the cam P, will have just thrown back the plate F, to its rearward position and left it perfectly free; the cams J, K, at the same time commence their action upon the sliding plates D, and E, and simultaneously carry forward the angular punch d, and the oval punch e; at the same instant that the said punches d, e, strike against the blank which has just been cut from a bar by the cutter e', the rearward projection I, from the head E', of the sliding plate E, strikes against the pivoted plate H, and thereby carries the sharpened rear section p', of the die-box to its closed position by the same means employed to carry the said blank into the die-box. When the advancing punch d, has inclosed the said blank within the die box, the outer surface of the cam K, retains the said punch in that position while the oval punch b, is driven forward by the cam M, and forms the hole in the blank; and by so doing, the said punch drives the metal which it displaces firmly into the vacant, angular spaces above and below the sharp edge of the rear section p', of the die-box; and if those spaces are not sufficiently ample to contain all the metal displaced in forming the eye of an ax poll, the spring s, permits the left-hand section c, of the die-box to give back a sufficient distance to prevent injury to the machine. Just before the oval punch b, reaches its extreme forward position, the cam J, ceases to act upon the sliding plate D, and allows the advancing punch b, to drive back the punch e, a sufficient distance to allow the punch b, to pass entirely through the finished ax poll and to deposit within the mouth of the punch d, the very thin piece of waste metal that will be left between the ends of the oval punches b, and e, at the close of the aforesaid operation. The instant after the extreme forward movement of oval punch b, has completely shaped the ax-poll within the die box, a reverse movement is imparted to said punch by the cam N; and simultaneously therewith a reverse movement is imparted to the angular punch d, and the oval punch e, by the cam L; and a few seconds later, the action of the cam P, on the sliding plate F, drives forward the left-hand section c, of the die-box and opens the rear side p' of the die-box; and by so doing, deposits the finished ax-poll upon the projecting portion of the lower side p', of the die box. The said finished ax-poll is ejected from the said position in front of the mouth of the die-box, by the rod a', which is driven forward at the proper time, by the cam-projection i', on the toothed wheel T', and is then instantly withdrawn by the spring m', which is combined therewith and with the frame of the machine.

Just before the advance of the angular punch d, and the oval punch e, to assist in forming an ax-poll, the projection r', on the cam J, will suddenly thrust forward the oval punch e, and the spring r, will as suddenly draw it back again; the effect of which movements will be to discharge the before mentioned thin oval piece of waste metal from the mouth of the said angular punch d.

An ax-poll formed in the above described machine will be firmer, stronger, and every way superior to an ax-poll formed in the usual manner; and I verily believe that human ingenuity will never succeed in inventing a machine, or a process of manufacture, based upon different principles from those invented by me, by which ax-polls can be produced that will compare favorably with those formed in my said machine.

The improved die-box, having three movable sides, employed in my said machine for making ax-polls, can also be advantageously used for making other articles.

By the term ax-poll, I mean the iron-portion of an ax in its proper preliminary shape for the reception of the steel which is to form the edge thereof.

What I claim as my invention and desire to secure by Letters Patent in the within described machine, is—

1. Constructing a die-box of three permanent and three movable sides, arranged and operating substantially as herein set forth.

2. I also claim arranging the vertically acting cutter $e'$, and the projecting portions of the sections $p$, $t$, of the die-box, or their equivalents, in such a manner, in relation to the other parts of the machine, that the said enumerated parts will operate substantially in the manner herein set forth.

3. I also claim combining the oval punches $b$, $e$, with the opposite movable sections $c$, $d$ of the die-box, when the said die-box is furnished with a sharp edged side $p'$, which acts in conjunction with the said oval punches in converting a rectangular shaped blank into a properly shaped ax-poll, substantially as herein set forth.

4. I also claim cutting a rectangular-shaped solid blank from the end of a bar and then driving said blank into a die-box and converting it into a properly shaped ax-poll, substantially in the manner herein set forth.

R. H. COLE.

Witnesses:
  A. R. CORBIN,
  S. H. SHAKESPEARE.